United States Patent Office 2,853,496

Patented Sept. 23, 1958

2,853,496

1-ALKOXY ETHINYL-2-ALKENYL DODECAHYDROPHENANTHRENE COMPOUNDS

Lewis H. Sarett, Princeton, N. J., assignor to Merck & Co., Inc., Rahway, N. J., a corporation of New Jersey No Drawing. Application October 12, 1955
Serial No. 540,166

12 Claims. (Cl. 260—340.9)

This invention relates to novel polyhydrophenanthrene compounds and processes of obtaining the same. More particularly, it is concerned with new tertiary alcohols of the polyhydrophenanthrene series which have an unsaturated aliphatic radical attached to the same ring carbon atom as the tertiary hydroxyl group, and methods of preparing these compounds. Specifically, it relates to new dodecahydrophenanthrene compounds containing at C-1 a hydroxyl group and an unsaturated aliphatic radical, and processes for the preparation of these compounds.

This application is a continuation-in-part of my copending application Serial No. 308,172, filed September 5, 1952, now abandoned, and Serial No. 310,133, filed September 17, 1952, now abandoned.

Tertiary dodecahydrophenanthrene carbinols of the formula:

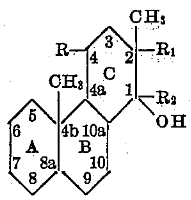

wherein R represents a keto or hydroxyl group, $R_1$ represents an unsaturated aliphatic radical, and $R_2$ represents a substituted or unsubstituted aliphatic hydrocarbon radical are valuable as intermediates in the preparation of steroid compounds. Thus, these tertiary carbinols having suitable unsaturated aliphatic radicals at positions 1 and 2 can be further treated to effect ring closure, thereby forming ring D of the steroid system and providing a functional substituent at the 17 position of the steroid.

It is an object of the present invention to provide novel dodecahydrophenanthrene compounds having at position 1 a tertiary hydroxyl and a substituted or unsubstituted unsaturated aliphatic radical, and processes of obtaining the same. Another object of my invention is to provide novel dodecahydrophenanthrene compounds having a tertiary hydroxyl and a substituted or unsubstituted unsaturated aliphatic radical in position 1, and in addition functional substituents in positions 2, 4, and 7. It is a further object of this invention to provide novel processes for the preparation of these new compounds.

Other objects will be apparent from the detailed description of my invention hereinafter provided.

In accordance with my invention, I have found that dodecahydrophenanthrene compounds having in ring C the structure:

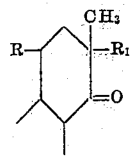

wherein R represents a keto or hydroxyl group and $R_1$ represents an unsaturated organic hydrocarbon radical are converted by reaction with an unsaturated metallo-organic compound to the corresponding tertiary carbinols having in ring C the structure:

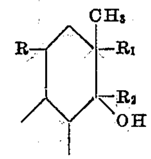

wherein R and $R_1$ are the same as defined above and $R_2$ represents the unsaturated radical of the metallo-organic compound. The 1-keto-2,4b-dimethyl-dodecahydrophenanthrene compounds employed in this reaction can be saturated or unsaturated, and may, in addition, contain substituents in rings A and B of the dodecahydrophenanthrene nucleus. Thus, rings A and B can contain substituents such as hydroxy, acyloxy, alkyl, ether, ketal, and the like, which do not affect the process of my invention. When starting materials containing another reactive keto substituent in rings A or B are employed, this group also reacts forming a ditertiary carbinol. However, such reactive keto groups in rings A and B can be blocked or protected by converting the keto group to an enol ether or a ketal derivative which on hydrolysis is reconverted to a keto substituent.

The novel process of my invention is of particular value in the preparation of the novel 7-ketal and 7-enol ether derivatives of dodecahydrophenanthrene compounds of the formula:

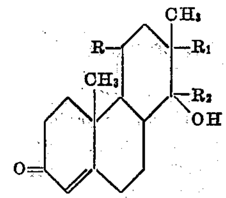

wherein R represents a keto or hydroxyl group, $R_1$ represents an unsaturated aliphatic hydrocarbon radical, $R_2$ represents a substituted or unsubstituted unsaturated aliphatic hydrocarbon radical. These compounds, which are valuable as intermediates in the synthesis of therapeutically important steroid compounds such as cortisone and the like, are obtained by reacting the corresponding 1-keto-dodecahydrophenanthrene with an unsaturated metallo-organic compound.

The 7-enol ether and 7-ketal derivatives of the dodecahydrophenanthrene compounds of the structural formula:

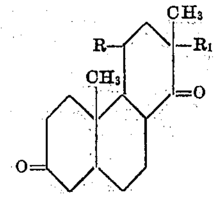

wherein R represents a keto or hydroxyl group and $R_1$ represents an unsaturated aliphatic hydrocarbon radical, are useful as starting materials in the processes of the present invention. Thus, enol ethers of the structural formula:

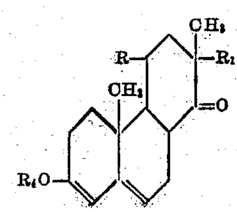

wherein $R_4$ is a hydrocarbon radical, are suitable starting materials. The methyl and ethyl enol ethers, which are readily prepared, are particularly suitable as starting materials. Cyclic ketal derivatives such as the 7-ethylenedioxy derivative of the formula

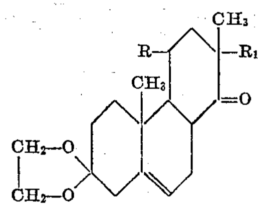

the corresponding monothioketal of the formula:

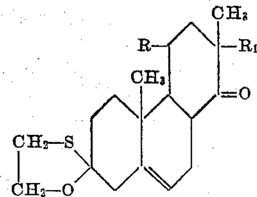

and the corresponding dithioketal of the formula:

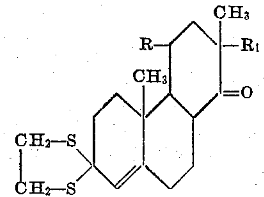

are also useful in the processes of the present invention. Similarly, other cyclic ketal derivatives such as the trimethylene, propylene and butylene ketals to protect the 7-keto substituent. Upon hydrolyzing these enol ether and ketal derivatives with acid, the protecting substituent is cleaved and the 7-keto compound having a double bond in position 8,8a is obtained.

Thus, in accordance with one embodiment of my invention, the starting compounds can be reacted with a Grignard type metallo-organic compound derived from substituted or unsubstituted alkenes or alkynes. For example, 2,4b-dimethyl-2-methallyl-7-ethylenedioxy-1,2,3,4,4a,4b,5,6,7,8,10,10a - dodecahydrophenanthrene - 1 - ol-4-one, or the corresponding 1,4-dione compound, can be reacted with magnesium-organo compounds such as an alkene (inter alia, allyl and the like), or an alkyne (inter alia, acetylene, ethoxy acetylene, and the like), magnesium halide to obtain the corresponding 1-hydroxy-1-alkenyl or 1-hydroxy-1-alkynyl derivative.

This addition reaction as illustrated by the preparation of 1 - ethoxyethinyl - 2,4b - dimethyl - 2 - methallyl - 7-ethylenedioxy - 1, 2, 3, 4, 4a, 4b, 5, 6, 7, 8, 10, 10a - dodecahydrophenanthrene-1-ol-4-one, is preferably carried out by the addition of a benzene solution of 2,4b-dimethyl-2 - methallyl - 7 - ethylenedioxy - 1,2,3,4,4a,4b,5,6,7,8,10,10a - dodecahydrophenanthrene - 1 - ol - 4 - one to a benzene solution of ethoxyacetylene magnesium bromide containing about 2 to 5 times the theoretical amount of the metallo-organic compound. The reaction is allowed to proceed at room temperature for about 2–4 hours and the resulting addition compound is then hydrolyzed in aqueous solution to obtain the desired tertiary alcohol. The tertiary alcohol is conveniently recovered from the hydrolysis mixture by extraction with a suitable organic solvent and evaporation of the resulting extract.

This process is carried out in similar manner when other organic magnesium halides are employed. Any suitable solvent can be used in place of the benzene. Since the Grignard type compounds are conveniently prepared in ethereal solution, the addition reaction can readily be carried out in an ethyl ether medium. However, solvents such as toluene, xylene, isopropyl ether, or hydrocarbon ether mixtures are equally satisfactory.

The amount of the metallo-organic compound used does not appear to be critical in the process. For optimum results I generally prefer to use about 2–5 times the theoretical quantity of organo-magnesium halide, although the operativeness of the process is not effected by an increase or a decrease in the quantity of reagent. When a dodecahydrophenanthrene-4-ol-1-one is employed as starting material, adjustments must be made in the amount of reagent charged since one mole of the Grignard type compound will be consumed in reaction with the free hydroxy substituent. On hydrolysis the complex so formed is decomposed and the hydroxyl group is regenerated.

The complexes formed as intermediates in these Grignard type reactions are decomposed to the 1-hydroxy-1-alkenyl or the 1-hydroxy-1-alkynyl derivatives by the addition of the reaction mixture to water. The desired tertiary alcohol is readily recovered from the aqueous mixture by extraction with a suitable water-immiscible solvent as discussed above.

Thus, in accordance with one embodiment of my invention, 2,4b-dimethyl - 2 - methallyl - 7 - ethylendioxy-1,2,3,4,4a,4b,5,6,7,8,10,10a - dodecahydrophenanthrene-4-ol-1-one is reacted with ethoxyacetylene magnesium bromide or with allyl magnesium bromide to obtain 1-ethoxyethinyl - 2,4b - dimethyl-2-methallyl-7-ethylenedioxy - 1,2,3,4,4a,4b,5,6,7,8,10,10a - dodecahydrophenanthrene - 1,4 - diol, and 1-allyl-2,4b-dimethyl-2-methallyl-7-ethylenedioxy - 1,2,3,4,4a,4b,5,6,7,8,10,10a - dodecahydrophenanthrene-1,4-diol, respectively. Similarly, the corresponding 1,4-dione on reaction with these magnesium bromide compounds yield the corresponding 1-ol-4-one compounds. Alternatively, the 1,4-diol compounds can be oxidized by treatment with suitable oxidizing agents, for example, the chromium trioxide-pyridine complex to oxidize the 4-hydroxy substituent and obtain the 1-ol-4-one compound.

Alternatively, in accordance with a further embodiment of my invention, the novel dodecahydrophenanthrene compounds of the present invention are also conveniently obtained by reacting the 1-keto-dodecahydrophenanthrene compounds with an alkali metal or alkaline earth metal acetylide. Since acetylides such as lithium and potassium acetylides are ordinarily prepared by the reaction of the free metal with acetylene in liquid ammonia, it is found most convenient to carry out the addition reaction in the liquid ammonia solution of the metal acetylides. The reaction is allowed to proceed as the ammonia is removed and the reaction mixture is gradually brought to room temperature. After the liquid ammonia is completely replaced by an inert organic solvent, the reaction product is decomposed and the isolation carried out in accordance with conventional procedures. This ethinylation reaction can also be carried out in a tertiary alcohol such as tertiary butanol or isopropanol. When these alcohols are employed as solvents, the ketone is added to an alcoholic solution of the alkali metal in the presence of an excess up to about 5 to 10 times the required theoretical amount of alkali acetylide, since maximum yields of the desired product are obtained using a large excess of the alkali acetylide under optimum conditions.

Thus, pursuant to this embodiment of my invention, 2,4b-dimethyl-2-methallyl - 7 - ethylenedioxy-1,2,3,4,4a,4b,5,6,7,8,10,10a-dodecahydrophenanthrene-1,4-dione, or the corresponding 4-ol-1-one compound is reacted with lithium or potassium acetylide to obtain the corresponding 1-ethinyl-1-hydroxy compound. In the same manner, other similar dodecahydrophenanthrene compounds containing a different unsaturated hydrocarbon radical in place of the 2-methallyl substituent, and/or a different blocking or protecting group such as an enol ether or another ketal derivative in place of the ethylenedioxy substituent can be reacted with a metal acetylide to obtain the corresponding 1-ethinyl-1-hydroxy derivatives.

In accordance with a further embodiment of my invention, I have found that these tertiary alcohols of the dodecahydrophenanthrene series can also be prepared by reacting the 1-keto-dodecahydrophenanthrene compound with a brominated lower aliphatic acid ester in the presence of metallic zinc. This reaction is conveniently carried out in an inert solvent medium such as an ether or an aromatic hydrocarbon, preferably at reflux temperature.

In the foregoing description of my invention, the reactions with 2-methallyl-7-ethylenedioxy compounds were presented as illustrative embodiments of this invention. It will be readily apparent to those skilled in the art that the process of my invention can be applied to other dodecahydrophenanthrene compounds having different unsaturated aliphatic radicals in the 2 position and different blocking or protecting groups in the 7 position. Thus, in place of using the 2-methallyl compounds, I can employ other dodecahydrophenanthrene compounds having different unsaturated aliphatic radicals such as the 2-allyl, 2-propargyl, and the like, to obtain the corresponding tertiary alcohols. Similarly, in place of employing compounds having the 7-keto substituent protected by the ethylenedioxy compounds, I can use other similar compounds having different protective substituents in the 7 position. Thus, for example, the 7-keto substituent can be blocked by the formation of an enol ether or another ketal derivative which can be readily hydrolyzed to regenerate the 7-keto substituent.

The tertiary alcohols of the dodecahydrophenanthrene series prepared in accordance with the processes of the present invention are valuable as intermediates in the preparation of steroids by total synthesis. The novel carbinols of this invention having an unsaturated aliphatic radical of less than 5 carbon atoms in the 1 position are of particular value as intermediates in the synthesis of steroids. These novel compounds after suitable modification of the side chain can be treated to effect ring closure and the formation of steroidal substances.

For example, the 2,4b-dimethyl-2-methallyl-1-ethoxyethinyl-7-ethylenedioxyl - 1,2,3,4,4a,4b,5,6,7,8,10,10a - dodecahydrophenanthrene-1-ol-4-one of M. P. 131–132° C. can be converted to the valuable adrenal hormones 11-dehydrocorticosterone and cortisone as follows:

When this ethoxyethinyl compound is treated with dilute sulfuric acid, 2,4*b*-dimethyl-2-methallyl-1-carboethoxy methylene-7-ethylenedioxy-1,2,3,4,4a,4b,5,6,7,8,10, 10*a*-dodecahydrophenanthrene-4-one, M. P. 94–96° C. is obtained. Upon hydrolyzing this compound with alkali the corresponding free acid, M. P. 203–205° C. is produced. Reduction of this keto acid with sodium borohydride to the 4-hydroxy acid, followed by reduction of the conjugated double bond with potassium-ammonia-isopropyl alcohol affords 2,4b-dimethyl-1-carboxymethyl-2-methallyl - 7 - ethylenedioxy-1,2,3,4,4a,4b,5,6,7,8,10,10a-dodecahydrophenanthrene-4-ol, M. P. 255–257° C. Reduction of this carboxymethyl compound with lithium aluminum hydride yields the corresponding 1-(β-hydroxyethyl) derivatives M. P. 199–201° C. and 210–211° C., which on reaction with p-toluene sulfonyl chloride in the presence of pyridine gives the 1-(β-toluene sulfonate), M. P. 157–158° C. Successive oxidations of this monotoyslate derivative with the chromium trioxide-pyridine complex, with oxmium tetroxide and with periodic acid yields 2,4b-dimethyl-1β,(β-p-toluenesulfonyloxyethyl)-2-acetonyl - 7 - ethylenedioxy - 1,2,3,4,4a,4b,5,6,7,8,10,10a-dodecahydrophenanthrene-4-one, M. P. 105–108° C. Upon reacting this product with sodium methoxide dl-3-ethylenedioxy - Δ⁵ - 17α - pregnene - 11,20 - dione, M. P. 212–214° C. is obtained which on equilibration with alkali gives the 3-ethylenedioxy derivative of dl-11-keto progesterone, M. P. 181–182.5° C. Acid hydrolysis of this product affords dl-11-keto-progesterone. Reaction of the 3-ethylenedioxy derivative of dl-11-ketoprogesterone with an oxalyl ester yields the corresponding 21-oxalyl ester compound which on hydrolysis is converted to the free acid. Resolution of the dl-21-oxalyl acid by means of the strychnine salt followed by hydrolysis of the oxalyl acid group gives 3-ethylenedioxy-$\Delta^5$-pregnene-11,20-dione, M. P. 175–176.5° C. which on hydrolysis with acid affords 11-ketoprogesterone, identical with material prepared from natural sources. Iodination and acetoxylation of the 21-oxalyl acid of 3-ethylenedioxy-$\Delta^5$-pregnene-11,20-dione obtained as described above yields successively crystalline 3 - ethylenedioxy-21-iodo-$\Delta^5$-pregnene-11,20-dione and 3-ethylenedioxy-$\Delta^5$-pregnene-21-ol-11,20-dione acetate, M. P. 193.5–194° C. Acid hydrolysis of this latter compound yields 11-dehydrocorticosterone identical with the product obtained from natural sources. Conversion of the 3-ethylenedioxy-$\Delta^5$-pregnene-21-ol-11,20-dione acetate to the 20 cyanhydrin, M. P. dec. 220–224° C., and dehydration of this product gives the $\Delta^{5,17}$-20-cyanopregnadiene, M. P. 203° C. which on oxidation with potassium permanganate yields 3-ethylenedioxy-$\Delta^5$-pregnene-17,21-diol-11,20-dione acetate, dec. 262–267° C. Acid hydrolysis of the latter compound yielded cortisone acetate.

Alternatively, following procedures described in detail in co-pending application Serial No. 310,133, 2,4b-dimethyl - 1 - carboxymethyl-2-methallyl-7-ethylene-dioxy-1,2,3,4,4a,4b,5,6,7,8,10,10a - dodecahydrophenanthrene-4-ol, which can be prepared as described above, can be converted to dl-11-ketoprogesterone as follows: 2,4b-dimethyl - 1 - carboxymethyl-2-methallyl-7-ethylenedioxy-1,2,3,4,4a,4b,5,6,7,8,10,10a-dodecahydrophenanthrene - 4-ol is reacted with an oxidizing agent to produce the corresponding 4-keto compound which is then reacted with an esterifying agent to form the corresponding 2,4b-dimethyl - 1 - carboalkoxymethyl-2-methallyl-7-ethylenedioxy - 1,2,3,4,4a,4b,5,6,7,8,10,10a - dodecahydrophenanthrene-4-one. Reaction of this compound with ozone followed by hydrolysis of the ozonide results in the obtainment of 2,4b - dimethyl-1-carboalkoxymethyl-2-acetonyl - 7 - ethylenedioxy-1,2,3,4,4a,4b,5,6,7,8,10,10a-dodecahydropenanthrene-4-one. The latter compound is reacted, under substantially anhydrous conditions, with a strong alkali thereby forming $\Delta^5$-3-ethylenedioxy-11,16,20 - triketopregnene. The $\Delta^5$-3-ethylenedioxy-11,16,20-triketopregnene is reacted with an organic sulfonyl halide thereby forming the corresponding sulfonate ester of $\Delta^{5,16}$ - 3 - ethylenedioxy-11,20-diketo-16-hydroxy-pregnadiene, which is reacted with hydrogen in the presence of a hydrogenation catalyst to produce $\Delta^5$-3-ethylenedioxy-11,20 - diketo-pregnene. The $\Delta^5$-3-ethylenedioxy-11,20-diketo-pregnene is then reacted with an aqueous mineral acid solution whereupon the ethylenedioxy substituent attached to the 3-carbon atom is hydrolyzed and, at the same time, the double bond shifts from ring B to ring A to form $\Delta^4$-3,11,20-triketo-pregnene.

The new compounds of the present invention having a 4-hydroxy substituent can be readily oxidized by treatment with an oxidizing agent such as pyridine-chromium trioxide complex to convert this substituent to a keto group.

In somewhat similar manner, 2,4b-1-allyl-2-methallyl-7 - ethylenedioxy - 1,2,3,4,4a,4b,5,6,7,8,10,10a-dodecahydrophenanthrene-1-ol-4-one obtained in accordance with the present invention can be converted to valuable steroid compounds. Oxidation of this 1-allyl-2-methallyl compound, first with osmium tetraoxide to form the corresponding 2-acetonyl compound, and then with periodic acid affords 2,4b-dimethyl-7-ethylenedioxy-2-acetonyl-1-formylmethyl - 1,2,3,4,4a,5,6,7,8,10,10a - dodecahydrophenanthrene-4-one. Treatment of this compound with an aqueous solution of potassium hydroxide produces $\Delta^{5,16}$-3-ethylenedioxypregnadiene-11,20-dione which upon selective hydrogenation in the presence of palladium affords the corresponding $\Delta^4$-pregnene compound. The $\Delta^4$-

3-ethylenedioxypregnene-11,20 dione can then be converted to cortisone as described above.

The 2,4b-dimethyl - 7 - ethylenedioxy - 1 - carbo-lower-alkoxy - methyl - 2-methallyl-1,2,3,4,4a,4b,5,6,7,8,10,10a-dodecahydrophenanthrene-1-ol-4-one compounds prepared as described herein can be converted to the corresponding 1-carb-lower alkoxy methylene derivative by treatment with thionyl chloride. This 1-carb-lower alkoxy methylene compound can then be converted to cortisone by the processes shown above.

The 2,4b-dimethyl-2-methallyl-7-ethylenedioxy-1,2,3,4,4a,4b,5,6,7,8,10,10a - dodecahydrophenanthrene - 4-ol-1-one, or the corresponding 1,4-dione compound, employed as starting materials in the examples illustrating this invention, can be prepared as disclosed and claimed in copending application Serial No. 445,921, filed July 26, 1954, now U. S. Patent 2,810,729.

Thus, these compounds can be prepared as follows:

After standing a few minutes at room temperature, a finely divided precipitate of potassium iodide separated from the reaction mixture. After 24 hours at room temperature, water was added and the organic material extracted with ether. The ethereal solution was evaporated to dryness and the residue chromatographed on alumina.

Consecutive fractions of the eluate (petroleum ether-ether) yield two isomeric forms of 2,4b-dimethyl-2-propargyl - 7 - ethylenedioxy-1,2,3,4,4a,4b,5,6,7,8,10,10a-dodecahydrophenanthrene-4-ol-1-one melting at 180° C. and 126–128° C. respectively. Hydrolysis of these compounds with acid yields the two isomeric 2,4b-dimethyl-2 - propargyl - 1,2,3,4,4a,4b,5,6,7,9,10,10a-dodecahydrophenanthrene-4-ol-1,7-diones.

In similar manner 2,4b-dimethyl-2-propargyl-7-ethylenedioxy-1,2,3,4,4a,4b,5,6,7,8,10,10a-dodecahydrophenanthrene-1,4-dione is obtained by reacting 2,4b-diemthyl-7-ethylenedioxy - 1,2,3,4,4a,4b,5,6,7,8,10,10a-dodecahydrophenanthrene-1,4-dione with propargyl iodide in the presence of potassium t-butoxide. Hydrolysis of this product with acid yields 2,4b-dimethyl-2-propargyl-1,2,3,4,4a,4b,5,6,7,9,10,10a-dodecahydrophenanthrene-1,4,1-trione.

The 2,4b-dimethyl-1,2,3,4,4a,4b,5,6,7,9,10,10a - dodecahydropenanthrene - 1,4,7 - trione and the 2,4b-dimethyl-1,2,3,4,4a,4b,5,6,7,9,10,10a - dodecahydrophenanthrene-4-ol-1,7-dione and the 7-ethylenedioxy derivatives thereof utilized as starting materials in this invention can be prepared as described in the copending application Serial No. 401,705, filed December 31, 1953. Thus, the 7-ethylenedioxy derivatives of 2,4b-dimethyl-1,2,3,4,4a,4b,5,6,7,9,10,10a - dodecahydrophenanthrene-1,4,7-trione and the corresponding 4-ol-1,7-dione compound can be prepared as follows:

β-Ethoxy-propionaldehyde is reacted with ethyl magnesium bromide to produce 1-ethoxy-3-hydroxy-pentane which is oxidized with chromic acid to form 1-ethoxy-3-keto-pentane. Upon reacting this compound with ethyl ortho-formate in alcohol solution containing a trace of hydrogen chloride, 1,3,3-triethoxy-pentane is obtained. Reaction of the latter compound with hot potassium acid sulfate produces 3-ethoxy-1,3-pentadiene. When the 3-ethoxy-1,3-pentadiene is condensed with benzoquinone in accordance with the Diels-Alder procedure, 5-methyl-6 - ethoxy - 1,4,4a,5,8,8a - hexahydronaphthalene - 1,4-dione is obtained. Hydrogenation of this compound in the presence of Raney nickel produced 5-methyl-6-ethoxy - 1,2,3,4,4a,5,8,8a - octahydronaphthalene - 1,4-dione. Further reduction of this compound by reaction with lithium aluminum hydride affords the corresponding diol - 5 - methyl - 6 - ethoxy - 1,2,3,4,4a,5,8,8a - octahydronaphthalene-1,4-diol. Upon reacting this compound with dilute acetic acid, 5-methyl-6-keto-perhydronaphthalene-1,4-diol is obtained. When the 5-methyl-6-keto-perhydronaphthalene is condensed with methyl vinyl ketone in an alkaline reaction medium 7-keto-4b-methyl - 1,2,3,4,4a,4b,5,6,7,9,10,10a-dodecahydrophenanthrene-1,4-diol is obtained. Upon reacting the latter product with ethylene glycol in the presence of p-tuolene sulfuric acid the corresponding 3-ethylenedioxy derivative, 4b-methyl - 7 - ethylenedioxy - 1,2,3,4,4a,4b,5,6,7,8,10,10a - dodecahydrophenanthrene - 1,4 - diol is obtained. Oxidizing this compound by reaction with aluminum isopropoxide in the presence of cyclohexanone forms a mixture containing 4b-methyl-7-ethylenedioxy-1,2,3,4,4a,4b,5,6,7,8,10,10a - dodecahydrophenanthrene-1,4-dione and the corresponding 4-ol-1-one compound which can be separated and recovered by fractional crystallization and/or chromatography. The products so obtained can be converted to the corresponding 2,4b-dimethyl compounds by first reacting the compounds with methyl formate in the presence of sodium hydride to obtain the 2-formyl derivatives, then reacting the formyl derivatives with methyl iodide in the presence of anhydrous potassium carbonate to produce the 2-formyl-2-methyl derivatives, and finally subjecting these latter derivatives to hydrolysis by chromatography over alkaline alumina to obtain respectively, 2,4b-dimethyl-7-ethylenedioxy - 1,2,3,4,4a,4b,5,6,7,8,10,10a - dodecahydrophenanthrene-1,4-dione and the corresponding 4-ol-1-one compound. Reaction of the latter compounds with a methallylhalide in the presence of an alkali metal or a metal alkoxide yields the corresponding 2-methallyl compounds used as starting materials in this application.

The following examples are presented for the purpose of illustrating methods of carrying out my invention.

EXAMPLE 1

*1 - ethoxyethinyl - 2,4b - dimethyl - 2 - methallyl - 7 - ethylenedioxy - 1,2,3,4,4a,4b,5,6,7,8,10,10a - dodecahydrophenanthrene-1-ol-4-one*

A solution of ethyl magnesium bromide (0.1526 m.) was prepared in the usual manner from 3.7 g. of magnesium and excess ethyl bromide in 100 ml. of dry ether. A solution of 11.74 g. of ethoxyacetylene (0.165 m.) diluted with dry ether to a total volume of 40 ml. was added gradually to the ethyl Grignard and stirred until the evolution of ethane ceased. 120 ml. of dry benzene was added to dissolve the ethoxyacetylene magnesium bromide.

A solution of 27 g. of dry 2,4b-dimethyl-2-methallyl-7 - ethylenedioxy - 1,2,3,4,4a,4b,5,6,7,8,10,10a - dodecahydrophenanthrene-1,4-dione (M. P. 108–109° C.) in 150 ml. of dry benzene was added rapidly to the stirred Grignard solution. After standing at room temperature for two hours, the reaction mixture was decomposed by pouring into ice-water. Enough saturated aqueous ammonium chloride was added to break the emulsion which formed. The benzene-ether layer was separated and washed once with water. The aqueous layer was extracted again with 500 ml. of a 1:1 benzene-ether solution which, after one water wash, was combined with the original extract. After drying over anhydrous sodium sulfate and removal of the latter by filtration, the solvents were distilled in vacuo. From a solution of the residual oil in ether were obtained crystals of the desired product, M. P. 133–134° C.

By using a stereochemical modification of the above starting material, M. P. 138–139° C., and treating as above described, two stereochemical modifications of 1-ethoxyethinyl-2,4b-dimethyl - 2 - methallyl - 7 - ethylenedioxy - 1,2,3,4,4a,4b,5,6,7,8,10,10a - dodecahydrophenanthrene-1-ol-4-one were obtained, M. P. 131–132° C. and M. P. 159–161° C.

EXAMPLE 2

*1 - ethoxyethinyl - 2,4b - dimethyl - 2 - methallyl - 7 - ethylenedioxy - 1,2,3,4,4a,4b,5,6,7,8,10,10a - dodecahydrophenanthrene-1,4-diol*

To a solution of ethyl magnesium bromide in 25 cc. of ether, prepared from 0.27 g. of magnesium (0.011 m.)

and excess ethyl bromide, was added 1.2 g. of ethoxyacetylene. The resulting solid ethoxyacetylene magnesium bromide was dissolved by the addition of 25 cc. of dry benzene. To this solution was added 1.00 g. (0.00277 m.) of crystalline 2,4b-dimethyl-2-methallyl-7-ethylenedioxy - 1,2,3,4,4a,4b,5,6,7,8,10,10a-dodecahydrophenanthrene-4-ol-1-one. After standing twenty hours at room temperature, the homogeneous reaction mixture was poured into ice-water and extracted with ether. Ammonium chloride solution was added during the extraction in an amount just sufficient to prevent the formation of emulsions. The ether extract was dried over anhydrous magnesium sulfate and concentrated to yield crystalline 1 - ethoxyethinyl - 2,4b - dimethyl - 2 - methallyl - 7-ethylenedioxy - 1,2,3,4,4a,4b,5,6,7,8,10,10a-dodecahydrophenanthrene-1,4-diol. After purification by recrystallization from ether-petroleum ether the product melted at 109–111° C.

EXAMPLE 3

*1 - allyl - 2,4b - dimethyl - 2 - methallyl - 7 - ethylenedioxy - 1,2,3,4,4a,4b,5,6,7,8,10,10a - dodecahydrophenanthrene-1,4-diol*

To 10 g. of 2,4*b*-dimethyl-2-methallyl-7-ethylenedioxy-1,2,3,4,4a,4b,5,6,7,8,10,10a - dodecahydrophenanthrene-4-ol-1-one was added with rapid stirring, 150 ml. of an approximately 0.5 m. ether solution of allyl magnesium bromide. The resulting mixture was stirred for one hour at room temperature and then 5 ml. of water was added dropwise, with cooling. The ether solution was decanted, and the residue extracted with 150 ml. of ether. The combined ether solutions were concentrated in vacuo to a yellow gum. This gum was adsorbed on alumina from a benzene-petroleum ether solution. Elution with petroleum ether-ether gave 1 - allyl - 2,4b - dimethyl - 2-methallyl - 7 - ethylenedioxy - 1,2,3,4,4a,4b,5,6,7,8,10,10a-dodecahydrophenanthrene-1,4-diol as a colorless amorphous solid.

Upon hydrolysis with acid, the ethylenedioxy substituent of 1-allyl-2,4b-dimethyl-2-methallyl-7-ethylenedioxy - 1,2,3,4,4a,4b,5,6,7,8,10,10a - dodecahydrophenanthrene-1,4-diol is cleaved to form 1-allyl-2,4b-dimethyl-2 - methallyl - 1,2,3,4,4a,4b,5,6,7,9,10,10a - dodecahydrophenanthrene-1,4-diol-7-one.

EXAMPLE 4

*1 - ethinyl - 2,4b - dimethyl - 2 - methallyl - 7 - ethylenedioxy - 1,2,3,4,4a,4b,5,6,7,8,10,10a - dodecahydrophenanthrene-1-ol-4-one*

A flame-dried 100 cc. flask, fitted with a potassium hydroxide drying tube, was cooled in a Dry Ice-acetone bath and charged with about 25 cc. of liquid ammonia. Metallic lithium (0.18 g., 0.0257 m.) was dissolved in the ammonia and dry acetylene bubbled through the solution until the blue color disappeared. To the resultant suspension of white lithium acetylide was added dropwise with stirring, over a five minute period, a solution of 0.97 g. (0.00271 m.) of 2,4b-dimethyl-2-methallyl-7-ethylenedioxy - 1,2,3,4,4a,4b,5,6,7,8,10,10a - dodecahydrophenanthrene-1,4-dione dissolved in 25 cc. of 1:1 benzene-ether solution. The flask was then removed from the Dry Ice bath and allowed to come to room temperature (stirring and slow acetylene introduction continued). This required about 45 minutes, most of the ammonia boiling off during this time. The stirring and acetylene addition were continued for an additional 45 minutes at room temperature. 20 cc. of water was then slowly added and the layers separated. The aqueous portion was extracted twice with chloroform and the combined chloroform-ether-benzene extract dried over magnesium sulfate. Concentration gave a crystalline residue of 1-ethinyl - 2,4b - dimethy - 2 - methallyl - 7 - ethylenedioxy-1,2,3,4,4a,4b,5,6,7,8,10,10a - dodecahydrophenanthrene-1-ol - 4 - one, M. P. 220–222° C. Recrystallization from ethyl acetate raised the melting point to 223.5–224.5° C.

EXAMPLE 5

*1 - ethinyl - 2,4b - dimethyl - 2 - methallyl - 7 - ethylenedioxy - 1,2,3,4,4a,4b,5,6,7,8,10,10a - dodecahydrophenanthrene - 1 - ol - 4 - one*

A solution of 1.8 g. (0.005 m.) of 2,4b - dimethyl - 2-methallyl - 7 - ethylenedioxy - 1,2,3,4,4a,4b,5,6,7,8,10,10a-dodecahydrophenanthrene - 1,4 - dione in 30 cc. of benzene was dried by the distillation of 20 cc. of benzene. After cooling to room temperature 20 cc. of 4% potassium in t-butanol (0.020 m.) was added. Dry acetylene gas was bubbled through the resulting cherry red solution for two hours. Then an additional 40 cc. of benzene was added to the reaction mixture and it was poured into 35 cc. of water. After separation of the layers the aqueous layer was extracted twice more with benzene, the combined benzene extracts dried over magnesium sulfate, and concentrated. The residue consisted of crystals and a yellow oil. Recrystallization from ethyl acetate yielded purified 1 - ethinyl - 2,4b - dimethyl - 2 - methallyl - 7-ethylenedioxy - 1,2,3,4,4a,4b,5,6,7,8,10,10a - dodecahydrophenanthrene - 1 - ol - 4 - one, M. P. 218–222° C.

EXAMPLE 6

*1 - ethinyl - 2,4b - dimethyl - 2 - methallyl - 7 - ethylenedioxy - 1,2,3,4,4a,4b,5,6,7,8,10,10a - dodecahydrophenanthrene - 1 - ol - 4 - one*

A dry flask, cooled in a Dry Ice-acetone bath, was charged with 50 cc. of liquid ammonia and 0.9 g. (0.0231 m.) of metallic potassium. Dry acetylene was bubbled into the solution until the deep blue color was replaced by a colorless suspension of potassium acetylide. Then 0.9 g. (0.0025 m.) of 2,4b - dimethyl - 2 - methallyl - 7 - ethylenedioxy - 1,2,3,4,4a,4b,5,6,7,8,10,10a-dodecahydrophenanthrene - 1,4 - dione, dissolved in 50 cc. of 1:1 benzene-ether, was added rapidly from a dropping funnel. The pink suspension was removed from the cold bath and stirring and acetylene bubbling continued as the mixture warmed to about 20° C. with concomitant evaporation of the ammonia. During this time the color changed from pink through purple to brown. When the temperature reached about 20° C. the mixture was poured slowly into 20 cc. of water, separated, and the aqueous layer extracted twice more with benzene. The combined extracts were dried over magnesium sulfate and the benzene removed in vacuo, leaving a residue consisting of crystals and a yellow oil. The oil was substantially removed by washing with cold methanol, leaving crystalline 1 - ethinyl - 2,4b - dimethyl - 2 - methallyl - 7 - ethylenedioxy - 1,2,3,4,4a,4b,5,6,7,8,10,10a-dodecahydrophenanthrene - 1 - ol - 4 - one, M. P. 212–220° C. Further purification was effected by recrystallization from ethyl acetate to give material melting at 220–222° C.

EXAMPLE 7

*Oxidation of 1 - allyl - 2,4b - dimethyl - 2 - methallyl-7 - ethylenedioxy - 1,2,3,4,4a,4b,5,6,7,8,10,10a - dodecahydrophenanthrene - 1,4 - diol*

To a solution of 5 g. of 1 - allyl - 2,4b - dimethyl - 2-methallyl - 7 - ethylenedioxy - 1,2,3,4,4a,4b,5,6,7,8,10,10a-dodecahydrophenanthrene - 1,4 - diol in 50 ml. of dry pyridine was added a suspension of 5 g. of chromium trioxide in 50 ml. of pyridine. The mixture was shaken well, and after standing for 16 hours at room temperature, was diluted with 400 ml. of water and extracted with four 250 ml. portions of ether. The combined ether extracts were evaporated to an oil which, upon crystallization from ether, gave 1 - allyl - 2,4b - dimethyl - 2 - methallyl - 7 - ethylenedioxy - 1,2,3,4,4a,4b,5,6,7,8,10,10a-dodecahydrophenanthrene - 1 - ol - 4 - one as a mixture of isomers, M. P. 127–142° C. Adsorption of 2 g. of this mixture on 110 g. of alumina, and elution, first with 7:3 petroleum ether-ether and then with ether, effected a separation into the two pure isomers: M. P. 146–147° C. and M. P. 160–161° C.

Upon hydrolysis with acid the ethylenedioxy substituent of 1 - allyl - 2,4b - dimethyl - 2 - methallyl - 7 - ethylenedioxy - 1,2,3,4,4a,4b,5,6,7,8,10,10a - dodecahydrophenanthrene - 1 - ol - 4 - one is cleaved to form 1 - allyl - 2,4b-dimethyl - 2 - methallyl - 1,2,3,4,4a,4b,5,6,7,9,10,10a - dodecahydrophenanthrene-1-ol-4,7-dione.

EXAMPLE 8

*1 - carbomethoxymethyl - 2,4b - dimethyl - 2 - methallyl-7 - ethylenedioxy - 1,2,3,4,4a,4b,5,6,7,8,10,10a - dodecahydrophenanthrene-1-ol-4-one*

A solution of 2.3 g. of 2,4b-dimethyl-2-methallyl-7-ethylenedioxy - 1,2,3,4,4a,4b,5,6,7,8,10,10a - dodecahydrophenanthrene-1,4-dione in 50 ml. of dry ether was stirred with 2.5 g. of Zn (dried after activation with dilute hydrochloric acid) and 0.75 ml. of methyl bromoacetate. After a short induction period the reaction started and a light yellow oily precipitate appeared which coated the zinc. Four additional portions of zinc (2.5 g.) and methyl bromoacetate (0.5 ml.) were added over a 24 hour period, the entire reaction being conducted at reflux temperature. The reaction mixture was then decomposed by the cautious addition of gladical aectic acid to the oily precipitate. After addition of water the ether layer was separated and washed with cold 1 N ammonium hydroxide until the washings no longer were yellow. After a final water wash the ethereal solution was dried over sodium sulfate, separated from the drying agent, and evaporated. Pure 1-carbomethoxylmethyl -2,4b - dimethyl - 2 - methallyl - 7-ethylenedioxy - 1,2,3,4,4a,4b,5,6,7,8,10,10a - dodecahydrophenanthrene-1-ol-4-one, M. P. 178–179° C., was isolated from the benzene solution of the crude residue, on alumina, by chromatography and elution with petroleum ether-ether (6:4).

Upon hydrolyzing 1-carbomethoxymethyl-2,4b-dimethyl - 2 - methallyl - 7 - ethylenedioxy - 1,2,3,4,4a,4b,5,6,7,-8,10,10a-dodecahydrophenanthrene-1-ol-4-one with acid, the ethylenedioxy substituent is cleaved to form 1-carbomethoxymethyl - 2,4b - dimethyl - 2 - methallyl - 1,2,3,4,-4a,4b,5,6,7,9,10,10a-dodecahydrophenanthrene-1-ol-4, 7-dione.

EXAMPLE 9

*Preparation of 2,4b - dimethyl - 1 - ethoxyethinyl - 2-methallyl - 7 - ethylenedioxy - 1,2,3,4,4a,4b,5,6,7,8,10,-10a-dodecahydrophenanthrene-1-ol-4-one*

Ethylmagnesium bromide was prepared from 680 mg. (0.0280 mole) of magnesium in 40 ml. of ether in the usual fashion and treated with an excess of ethoxyacetylene in ether. When the evolution of ethane had ceased, the oily Grignard reagent was dissolved by the addition of 20 ml. of benzene. To the resulting homogeneous brown solution was added in one portion a solution of 5.00 g. (0.0140 mole) of 2,4b-dimethyl-2-methallyl-7-ethylenedioxy - 1,2,3,4,4a,4b,5,6,7,8,10,10a-dodecahydrophenanthrene-1,4-dione in 50 ml. of benzene. After four hours at room temperature, the homogeneous reaction mixture was poured into ice-water. Ether was added and then saturated ammonium chloride solution in a quantity just sufficient to break the emulsion that had formed. The aqueous layer was separated and extracted twice with ether. The combined organic extract was washed with water, dried and concentrated in vacuo. A benzene solution of the crude crystalline product was adsorbed on alkaline alumina. With 1:1 ether-petroleum ether there was eluted 4.57 g. (76%) of 2,4b-dimethyl-1-ethoxyethinyl - 2 - methallyl - 7 - ethylenedioxy - 1,2,3,4,4a,4b,5,6,7,8,10,10a-dodecahydrophenanthrene-1-ol-one, M. P. 125–131° C. The analytical sample melted at 131–132° C. after recrystallization from ether; λ max. 2.76, 4.48, 5.90, 6.08 μ.

*Analysis.*—Calcd. for $C_{26}H_{38}O_5$: C, 72.86; H, 8.47. Found: C, 72.88; H, 8.36.

Further elution with ether yielded 590 mg. (9.8%) of the isomeric 2,4b-dimethyl-1-ethoxyethinyl-2-methallyl-7-ethylenedioxy - 1,2,3,4,4a,4b,5,6,7,8,10,10a - dodecahydrophenanthrene-1-ol-4-one melting at 150–161° C. Recrystallization from ether gave a sample with M. P. 159–161° C.; λ max. 2.85, 4.50, 5.90, 6.08 μ.

*Analysis.*—Found: C, 72.81; H, 8.24.

EXAMPLE 10

*Preparation of 2,4b,dimethyl-1-carbethoxymethyl-2-methallyl - 7 - ethylenedioxy - 1,2,3,4,4a,4b,5,6,7,8,10,10a - dodecahydrophenanthrene-1-ol-4-one*

One-quarter milliliter of 10% sulfuric acid was added to a solution of 140 mg. of 2,4b-dimethyl-1-ethoxyethinyl-2 - methallyl - 7 - ethylenedioxy - 1,2,3,4,4a,4b,5,6,7,8,10, 10a-dodecahydrophenanthrene-1-ol-4-one melting at 150–161° C. in 4 ml. of tetrahydrofuran. After seven hours at room temperature, the reaction mixture was poured into excess sodium bicarbonate solution and the tetrahydrofuran was removed in vacuo. The product was extracted with ether and chromatographed over 4.5 g. of alkaline alumina. With 3:7 ether-petroleum ether there was eluted 109 mg. (75%) of 2,4b-dimethyl-1-carbethoxymethyl-2-methallyl - 7 - ethylenedioxy - 1,2,3,4,4a,4b,5,6,7,8,10, 10a-dodecahydrophenanthrene-1-ol-4-one melting at 114–118° C. The analytical sample had a melting point of 118–119° C. after recrystallization from petroleum ether; λ max. 2.83, 5.83, 6.03 μ.

*Analysis.*—Calcd. for $C_{26}H_{38}O_6$: C, 69.93; H, 8.58. Found: C, 70.26; H, 8.50.

Various changes and modifications may be made in carrying out the present invention without departing from the spirit and scope thereof. Insofar as these changes and modifications are within the purview of the annexed claims, they are to be considered as part of my invention.

I claim:

1. The process which comprises reacting 2,4b-dimethyl-2 - methallyl - 7 - ethylenedioxy - 1,2,3,4,4a,4b,5,6,7,8,10, 10a-dodecahydrophenanthrene-1,4-dione with ethoxyacetylene magnesium bromide and hydrolyzing the resulting reaction product to obtain 1-ethoxyethinyl-2,4b-dimethyl-2 - methallyl - 7 - ethylenedioxy - 1,2,3,4,4a,4b,5,6,7,8,10, 10a-dodecahydrophenanthrene-1-ol-4-one.

2. The process which comprises reacting 2,4b-dimethyl-2 - methallyl - 7 - ethylenedioxy - 1,2,3,4,4a,4b,5,6,7,8,10, 10a-dodecahydrophenanthrene-4-ol-1-one with ethoxyacetylene magnesium bromide and hydrolyzing the resulting reaction product to obtain 1-ethoxyethinyl-2,4b-dimethyl-2 - methallyl - 7 - ethylenedioxy - 1,2,3,4,4a,4b,5,6,7,8,10, 10a-dodecahydrophenanthrene-1,4-diol.

3. The process which comprises reacting 2,4b-dimethyl-2 - methallyl - 7 - ethylenedioxy - 1,2,3,4,4a,4b,5,6,7,8,10, 10a-dodecahydrophenanthrene-1,4-dione with allyl magnesium bromide and hydrolyzing the resulting reaction product to obtain 1-allyl-2,4b-dimethyl-2-methallyl-7-ethylenedioxy - 1,2,3,4,4a,4b,5,6,7,8,10,10a - dodecahydrophenanthrene-1-ol-4-one.

4. The process which comprises reacting 2,4b-dimethyl-2 - methallyl - 7 - ethylenedioxy - 1,2,3,4,4a,4b,5,6,7,8,10, 10a-dodecahydrophenanthrene-4-ol-1-one with allyl magnesium bromide and hydrolyzing the resulting reaction product to obtain 1-allyl-2,4b-dimethyl-2-methallyl-7-ethylenedioxy - 1,2,3,4,4a,4b,5,6,7,8,10,10a - dodecahydrophenanthrene-1,4-diol.

5. 1 - ethoxyethinyl - 2,4b - dimethyl - 2 - methallyl-7 - ethylenedioxy - 1,2,3,4,4a,4b,5,6,7,8,10,10a - dodecahydrophenanthrene-1-ol-4-one.

6. A stereochemical modification of 1-ethoxyethinyl-2,4b - dimethyl - 2 - methallyl - 7 ethylenedioxy - 1,2,3, 4,4a,4b,5,6,7,8,10,10a - dodecahydrophenanthrene - 1-ol-4-one, melting at about 133–134° C.

7. A stereochemical modification of 1 - ethoxyethinyl-2,4b - dimethyl - 2 - methallyl - 7 - ethylenedioxy - 1,2,3, 4,4a,4b,5,6,7,8,10,10a - dodecahydrophenanthrene - 1-ol-4-one, melting at about 131–132° C.

8. 1 - ethovyethinyl - 2,4b - dimethyl - 2 - methallyl-7 - ethylenedioxy - 1,2,3,4,4a,4b,5,6,7,8,10,10a- dodecahydrophenanthrene-1,4-diol.

9. 1 - allyl - 2,4b - dimethyl - 2 - methallyl - 7- ethylenedioxy - 1,2,3,4,4a,4b,5,6,7,8,10,10a - dodecahydrophenanthrene-1,4-diol.

10. 1 - allyl - 2,4b - dimethyl - 2 - methallyl - 7 - ethylenedioxy - 1,2,3,4,4a,4b,5,6,7,8,10,10a - dodecahydrophenanthrene-1-ol-4-one.

11. The process which comprises reacting a member from the group consisting of 7-lower alkylene ketal and 7-lower alkyl-enol ether derivatives of a compound of the formula

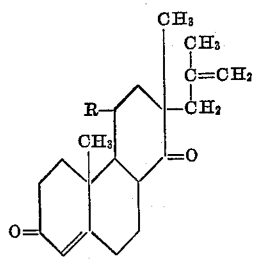

wherein R is a member from the group consisting of hydroxyl and keto, with a magnesium salt from the group consisting of allyl magnesium halides and ethoxyacetylene magnesium halides to produce the corresponding 7-derivatives of the formula

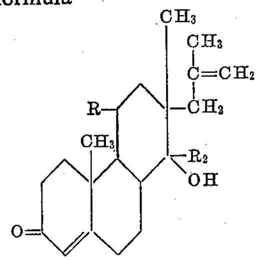

wherein R is the same as defined above and $R_2$ is a substituent from the group consisting of allyl and ethoxyethinyl.

12. A dodecahydrophenanthrene compound from the group consisting of compounds of the formula

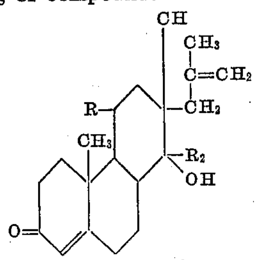

wherein R is a member from the group consisting of hydroxyl and keto and $R_2$ is a member from the group consisting of allyl and ethoxyethinyl, and the 7-lower alkyl-enol ethers and the 7-lower alkyl-ketal derivatives thereof.

No references cited.